United States Patent [19]
De Tola

[11] 3,985,086
[45] Oct. 12, 1976

[54] FREEZER, VACUUM, OVEN SEWAGE TREATMENT SYSTEM

[75] Inventor: Vincent D. De Tola, Bronx, N.Y.

[73] Assignee: The Raymond Lee Organization, Inc., New York, N.Y. ; a part interest

[22] Filed: June 9, 1975

[21] Appl. No.: 584,705

[52] U.S. Cl. .................................. 110/8 P; 241/23
[51] Int. Cl.² ............................................ F23G 5/02
[58] Field of Search .......... 110/8 R, 8 E, 8 P, 18 R, 110/7 R; 241/18, 23

[56] References Cited
UNITED STATES PATENTS

| | | | |
|---|---|---|---|
| 2,879,005 | 3/1959 | Jarvis | 241/23 X |
| 3,780,675 | 12/1973 | Frye et al. | 110/8 |
| 3,884,162 | 5/1975 | Schuster | 110/8 |
| 3,921,917 | 11/1975 | Meinass | 241/18 |

*Primary Examiner*—Kenneth W. Sprague
*Attorney, Agent, or Firm*—Daniel Jay Tick

[57] ABSTRACT

Raw sewage, garbage, waste, and the like, is ground and supplied to a freezer and vacuum chamber where it is frozen. The water is drawn off by vacuum and waste matter is supplied to an electronic oven where it is reduced to ash. Compressed air and accumulated gas supplies the matter from the freezer and vacuum chamber to the electronic oven. Compressed air and gas are the propelling agents which move the matter. The system is a sealed operation, vented only in an emergency.

2 Claims, 2 Drawing Figures

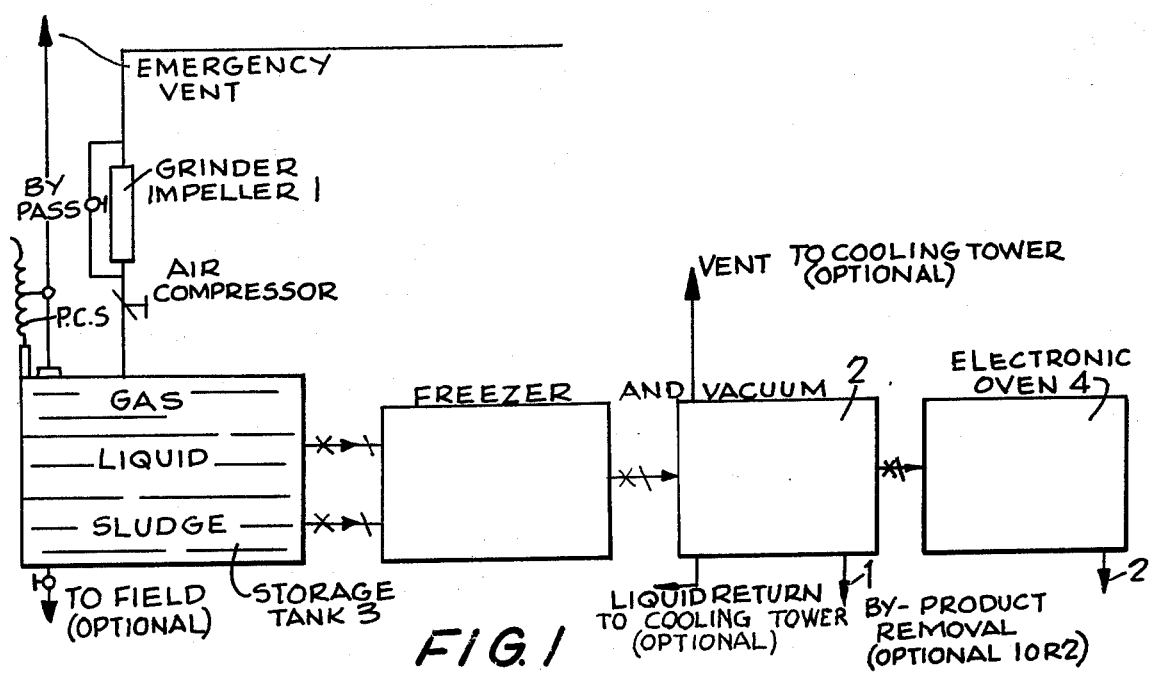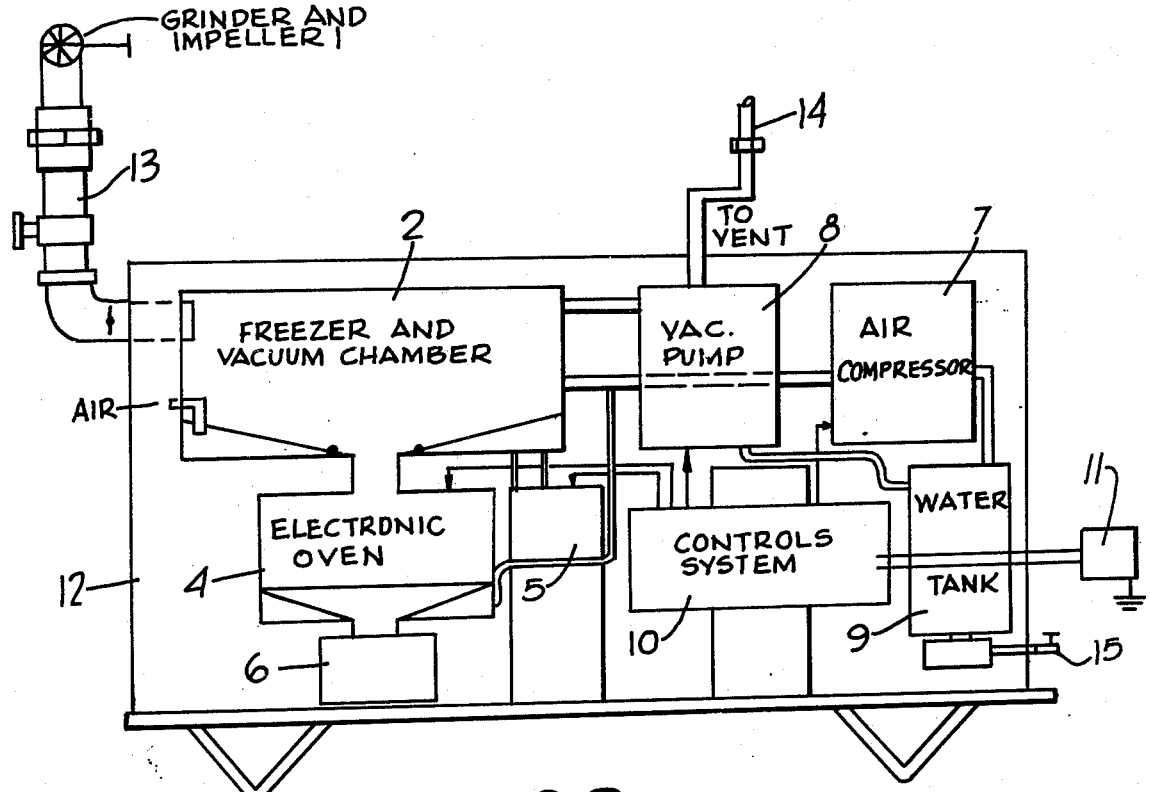

FREEZER, VACUUM, OVEN SEWAGE TREATMENT SYSTEM

DESCRIPTION OF THE INVENTION

The present invention relates to a sewage treatment system. More particularly, the invention relates to a sewage treatment system for treating raw sewage, ground garbage, waste, and the like.

Objects of the invention are to provide a sewage treatment system which eliminates the necessity for sewer lines, facilitates the conversion of sewage and waste into useful by-products, is not polluting to the atmosphere, permits constructive use of lands now limited by sewage requirements and ecological regulations, reclaims water, and may be added to existing sewage plants to dispose of sludge which is presently buried or dumped at sea, produces land fill material, may be adapted to industrial units for cleaning industrial smoke and solids, facilitates separate salvage, compaction, shredding, and the like, of solid waste which cannot be processed therethrough such as, paper and metals, and is incorporatable as individual building or house units.

Methane gas may be reclaimed and compressed and concentrated by the system of the invention. The methane gas may be burned as fuel.

In order that the invention may be readily carried into effect, it will now be described with reference to the accompanying drawing, wherein:

FIG. 1 is a block diagram of an embodiment of the sewage treatment system of the invention for multiple dwellings and sewage sludge treatment; and FIG. 2 is a schematic diagram of a miniaturized equivalent of FIG. 1 for private home use.

The sewage treatment system of the invention treats raw sewage, ground garbage, waste, and the like.

Raw sewage, garbage, waste, and the like, are ground in a grinder and impeller 1 and supplied under pressure thereby to a freezer and vacuum chamber 2. The raw material may first be stored in a storage tank 3 (FIG. 1) wherein the sludge settles to the bottom, the liquid rises above the sludge, and the gas rises above the liquid. This is processed in separate cycles.

The ground material is frozen in the freezer and vacuum chamber 2 and the water is drawn off by vacuum and waste matter is supplied by compressed air and gas pressure to an electronic oven 4. The matter from the freezer and vacuum chamber 2 is reduced to ash in the electronic oven.

As shown in FIG. 2, a refrigeration and compression unit 5 of any suitable known type is provided to control the freezer and vacuum chamber 2, which is of any suitable known type. A removal container 6 may be provided for removing the ash produced by the electronic oven 4, which oven is of any suitable known type. An air compressor 7 of any suitable known type and a vacuum pump 8 of any suitable known type are coupled to the freezer and vacuum chamber 2 to draw off the fluid and to transfer the matter therefrom by compressed air. A water storage tank 9 is coupled to the vacuum chamber 2 via the vacuum pump 8 which supplies water as a coolant or refrigerant, in a manner similar to a cooling tower.

The electronic oven 4, air compressor 7, vacuum pump 8 and refrigeration compression unit 5 are electrically controlled by a control system 10 of any suitable known type which is electrically connected to such units, and is energized by a source of electrical energy 11.

The entire sewage treatment system of the invention may be housed in a compact small volume housing or container 12 so that it is readily available for insulation in individual houses or buildings. In such case, the grinder and impeller 1 are installed in the sewage pipe 13 of the building. An air vent pipe 14 is provided from the vacuum pipe 8 and a water outlet pipe 15 is provided from the water tank 9.

While the invention has been described by means of a specific example and in a specific embodiment, I do not wish to be limited thereto, for obvious modifications will occur to those skilled in the art without departing from the spirit and scope of the invention.

I claim:

1. A sewage treatment system for treating raw sewage, garbage, waste, and the like, said sewage treatment system comprising
    freezing and evacuating means for freezing raw sewage, garbage, waste, and the like and drawing off water from the frozen material by vacuum;
    grinding and impelling means for grinding and supplying raw sewage, garbage, human waste, and the like to the freezing and evacuating means under pressure and non-vented;
    oven means for reducing the matter to ash;
    gas and compressed air means for supplying the frozen matter from the freezing and evacuating means to the oven means;
    vacuum pump outlet means for venting the system;
    water storage means; and
    means for supplying water derived from the raw sewage, garbage, waste, and the like, by the freezing and evacuating means to the water storage means for recycling as refrigerant and thence to ground.

2. A sewage treatment system as claimed in claim 1, wherein the oven means comprises an electronic oven.

* * * * *

UNITED STATES PATENT AND TRADEMARK OFFICE
CERTIFICATE OF CORRECTION

PATENT NO. : 3,985,086
DATED : October 12, 1976
INVENTOR(S) : Vincent D. De Toia It is certified that error appears in the above–identified patent and that said Letters Patent are hereby corrected as shown below:

The name of the patentee is

Vincent D. De Toia

Signed and Sealed this

Fourth Day of January 1977

[SEAL]

*Attest:*

RUTH C. MASON
*Attesting Officer*

C. MARSHALL DANN
*Commissioner of Patents and Trademarks*